US012243165B2

(12) United States Patent
Patel et al.

(10) Patent No.: US 12,243,165 B2
(45) Date of Patent: Mar. 4, 2025

(54) METHOD AND SYSTEM OF PROVIDING RETENTION FOR COMPUTER-AIDED DESIGN OF REMOVABLE OBJECTS

(71) Applicant: James R. Glidewell Dental Ceramics, Inc., Newport Beach, CA (US)

(72) Inventors: Priyank Patel, Anaheim, CA (US); Martin Jajam, Lake Forest, CA (US)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 449 days.

(21) Appl. No.: 16/683,708

(22) Filed: Nov. 14, 2019

(65) Prior Publication Data

US 2021/0150809 A1    May 20, 2021

(51) Int. Cl.
*G06T 17/20*    (2006.01)
*G06F 30/20*    (2020.01)
*G06F 30/23*    (2020.01)

(52) U.S. Cl.
CPC .............. *G06T 17/20* (2013.01); *G06F 30/20* (2020.01); *G06F 30/23* (2020.01)

(58) Field of Classification Search
CPC . G06T 17/20; G06T 2200/24; G06T 2210/41; G06T 2219/2021; G06T 19/20; G06F 30/20; G06F 30/23; G06F 30/25; G06F 30/27; G06F 30/28; G06F 30/367; G06F 30/398; A61C 7/002
See application file for complete search history.

(56) References Cited

U.S. PATENT DOCUMENTS

| | | | |
|---|---|---|---|
| 4,710,876 A | 12/1987 | Cline et al. | |
| 7,149,596 B2 | 12/2006 | Berger et al. | |
| 9,308,055 B2 | 4/2016 | Fisker et al. | |
| 9,364,296 B2 | 6/2016 | Kuo | |
| 10,925,690 B2 | 2/2021 | Kuo | |
| 11,678,956 B2 | 6/2023 | Kuo | |
| 2008/0261165 A1* | 10/2008 | Steingart | B33Y 50/00 433/24 |
| 2009/0248184 A1* | 10/2009 | Steingart | A61C 1/084 700/98 |
| 2012/0287128 A1* | 11/2012 | Chang | G06T 17/20 345/423 |
| 2013/0230827 A1 | 9/2013 | Kwon | |
| 2014/0278279 A1* | 9/2014 | Azernikov | A61C 13/0003 703/1 |

(Continued)

FOREIGN PATENT DOCUMENTS

| | | |
|---|---|---|
| EP | 3417830 A1 | 12/2018 |
| EP | 3212119 B1 | 4/2019 |

(Continued)

OTHER PUBLICATIONS

Arikan, Murat, et al. "O-snap: Optimization-based snapping for modeling architecture." ACM Transactions on Graphics (TOG) 32.1 (2013): 1-15. (Year: 2013).*

(Continued)

*Primary Examiner* — Michael Edward Cocchi
(74) *Attorney, Agent, or Firm* — Klarquist Sparkman, LLP

(57) ABSTRACT

A computer-implemented system and method of generating a digital retention mesh with one or more morphable regions, the one or more morphable regions corresponding to one or more removed undercut regions.

18 Claims, 19 Drawing Sheets

(56) References Cited

U.S. PATENT DOCUMENTS

2015/0250568 A1 9/2015 Fisker et al.
2016/0328495 A1 11/2016 Lanka et al.

FOREIGN PATENT DOCUMENTS

WO 2012110850 A3 8/2012
WO 2013124452 A1 8/2013
WO 2018231583 A1 12/2018

OTHER PUBLICATIONS

Amberg, Brian, Sami Romdhani, and Thomas Vetter. "Optimal step nonrigid ICP algorithms for surface registration." 2007 IEEE conference on computer vision and pattern recognition. IEEE, 2007. (Year: 2007).*

Rabbani, Tahir, Frank Van Den Heuvel, and George Vosselmann. "Segmentation of point clouds using smoothness constraint." International archives of photogrammetry, remote sensing and spatial information sciences 36.5 (2006): 248-253. (Year: 2006).*

Attene, Marco, et al. "Sharpen&bend: Recovering curved sharp edges in triangle meshes produced by feature-insensitive sampling." IEEE Transactions on Visualization and Computer Graphics 11.2 (2005): 181-192. (Year: 2005).*

Dai, Ning, et al. "Digital modeling technology for full dental crown tooth preparation." Computers in Biology and Medicine 71 (2016): 190-197. (Year: 2016).*

Tsz-Ho Kwok et al., Boolean Operation—an overview, Science Direct, [retrieved Mar. 3, 2021], printed Mar. 3, 2021, in 8 pages, retrieved from the Internet: <https://www.sciencedirect.com/topics/engineering/boolean-operation>.

Ming Chen et al., Efficient Boolean Operation on Manifold Mesh Surfaces, Computer-Aided Design & Applications, 7 (3), 2010, pp. 405-415.

W. Li, R. R. Martin and F. C. Langbein, "Molds for Meshes: Computing Smooth Parting Lines and Undercut Removal," in IEEE Transactions on Automation Science and Engineering, vol. 6, No. 3.

Gang Mei et al., Simple and Robust Boolean Operations for Triangulated Surfaces, Institute of Earth and Environmental Science, University of Freiburg, arXiv:1308.4434v2 [cs,CG] Aug. 25, 2013, in 18 pages.

* cited by examiner

METHOD AND SYSTEM OF PROVIDING RETENTION FOR COMPUTER-AIDED DESIGN OF REMOVABLE OBJECTS

BACKGROUND

A negative mold or appliance is designed as the negative of an object which will be formed by the mold or an existing object on which the appliance will be placed. The negative mold or appliance is designed such that it can be removed or placed by motion along some direction. Relative to this direction there may be undercut regions present. Undercut regions can prevent and/or inhibit separating the mold and the object once it is formed from the mold and/or can limit/prevent insertion and/or removal of the appliance on the object by requiring excessive force to insert or remove. Excessive force can damage the mold, appliance, or object. To avoid this, undercut regions are digitally removed from the design of the mold or appliance.

With undercut regions removed, the formed object can be easily removed from the mold, or the appliance can be easily inserted or removed from the object. However, this can cause the formed object or appliance to be removed by its own gravity or other forces (low retention).

One challenge conventionally is the ability to design a mold or appliance accurately at a detailed level to retain an object while allowing its insertion and/or removal, for example. The ability to provide customizable retention in different areas and amounts to retain the object and facilitate its insertion and removal can also be conventionally challenging.

SUMMARY

A computer-implemented method of providing a digital retention feature includes receiving a digital undercut mesh comprising one or more undercut regions, receiving a digital non-undercut mesh comprising one or more removed undercut regions and generating a digital retention mesh comprising one or more morphable regions, the one or more morphable regions corresponding to the one or more removed undercut regions A computer-implemented method of designing a digital retention feature includes receiving a digital retention mesh comprising one or more morphable regions, the one or more morphable regions comprising one or more removed undercut regions from an undercut mesh, selecting a morph region on the digital retention mesh, and selecting a morph amount to modify at least a portion of the shape of the selected morph region to the digital retention mesh to provide a retention feature.

A system for providing a digital retention feature, includes a processor, a computer-readable storage medium having instructions executable by the processor to perform steps including: receiving a digital undercut mesh comprising one or more undercut regions, receiving a digital non-undercut mesh comprising one or more removed undercut regions, and generating a digital retention mesh comprising one or more morphable regions, the one or more morphable regions corresponding to the one or more removed undercut regions.

DETAILED DESCRIPTION

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Disclosed is a computer-implemented method of providing one or more digital retention features in some embodiments. In some embodiments, the computer-implemented method can include receiving a digital undercut mesh 100 that includes one or more undercut regions, receiving a digital non-undercut mesh 200 that includes one or more removed undercut regions, and generating a digital retention mesh including one or more morphable regions, the one or more morphable regions corresponding to the one or more removed undercut regions.

Figure 1A:
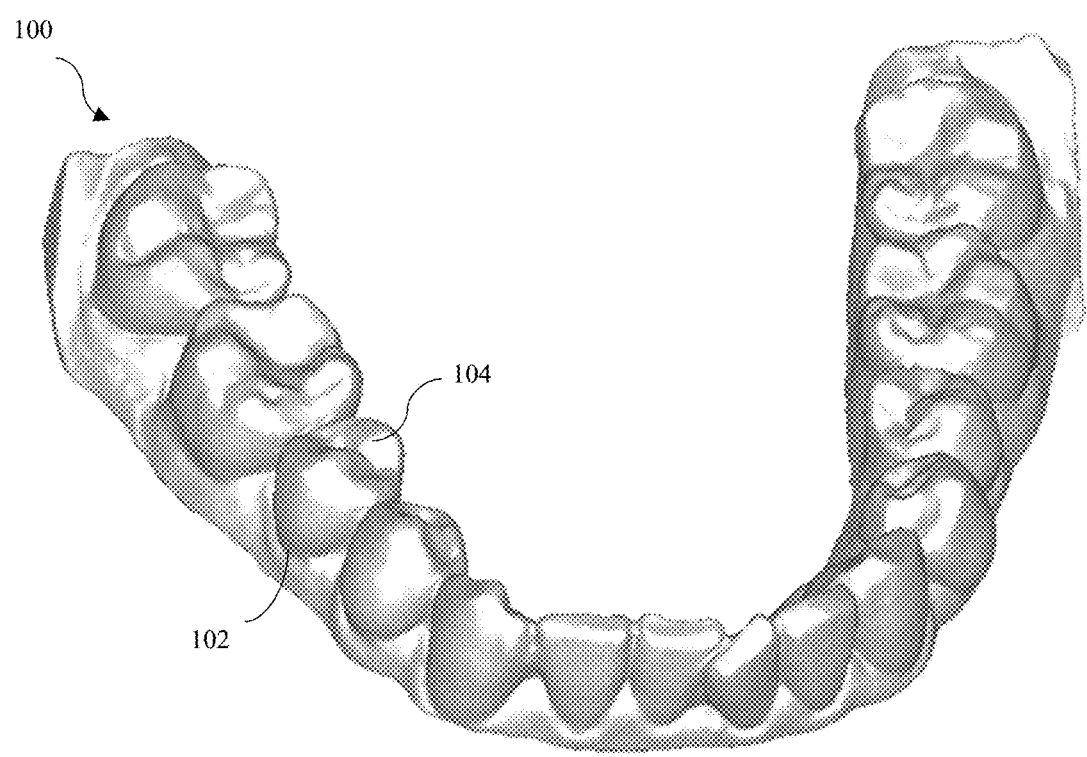
FIG. 1(a) is a perspective view of a digital undercut mesh.

FIG. 1(A) illustrates one example of the digital undercut mesh that can be generated by scanning an object using any scanning technique known in the art including, but not limited to, for example, optical scanning, intraoral scanning, CT scanning, etc. In some embodiments, the scanning can produce STL, PLY, or CTM files, for example. A conventional scanner typically captures the shape of the physical object in 3 dimensions during a scan and digitizes the shape into a 3 dimensional digital undercut mesh 100. The digital undercut mesh 100 can include multiple interconnected polygons in a digital undercut mesh topology that corresponds to the shape of the physical object, for example. In some embodiments, the polygons can include two or more digital triangles. In some embodiments, the digital undercut mesh 100 can include other polygon shapes.

In some embodiments, the physical object can include volumetric features such as one or more undercut regions. An undercut region can be, for example a space formed by an absence of material from a lower portion of the object. The negative appliance material can occupy the space, thereby obstructing the appliance from removal by the upper portion of the object.

During a conventional scan of an object, the scanner can typically capture undercut regions and generate a digital undercut mesh with one or more digital undercut regions, for example.

Figure 1B:
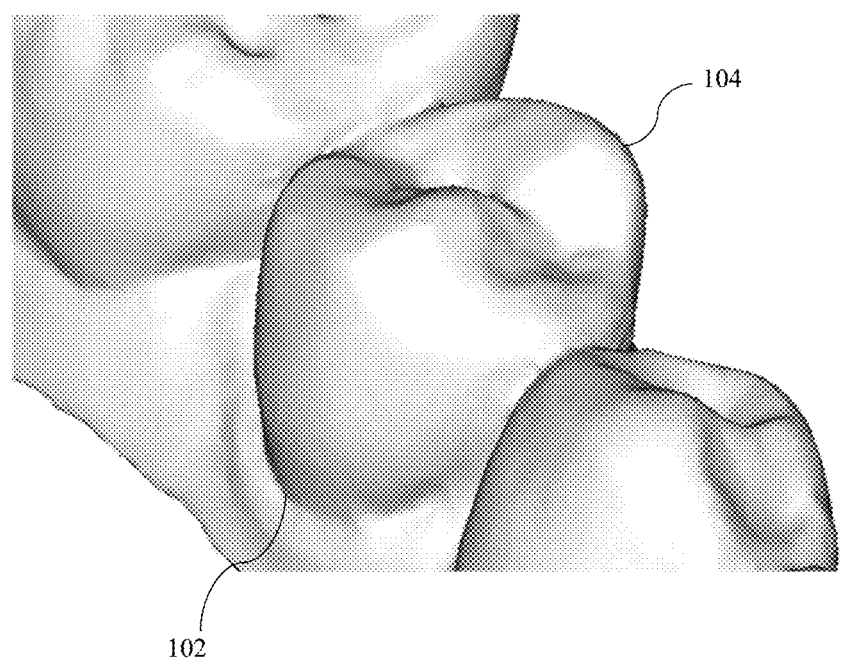
FIG. 1(b) is a perspective view of a portion of the digital undercut mesh.

FIG. 1(A) illustrates an example in some embodiments of a digital undercut mesh 100 generated by a scanner from a patient's dentition that contains one or more undercut regions, for example. The digital undercut mesh 100 can match the shape of the patient's dentition and include one or more digital undercut regions such as digital undercut region 102 for a 2nd premolar 104 corresponding to one of the one or more physical undercut regions. FIG. 1(B) illustrates a close up view of the digital undercut region 102. Although a single digital undercut region is shown in FIG. 1(A) and FIG. 1(B), the digital undercut mesh 100 can include one or more digital undercut regions.

In some embodiments, the computer-implemented method can also receive a digital non-undercut mesh in which the one or more undercut regions from the digital undercut mesh are removed. In some embodiments, the digital non-undercut mesh can have the same shape as the digital undercut mesh 100, except for the one or more removed undercut regions.

A first step in removal of the one or more undercut regions from the digital undercut mesh 100 can include converting a digital undercut model of the digital undercut mesh 100 from a triangular mesh to a voxel representation. A voxel field (3D discrete scalar field) that includes the entire digital undercut model being converted can be generated. Each generated voxel is assigned a numerical value which represents the signed distance (in voxel units) of the voxel to the closest point on the model. A negative distance is inside the model, and a positive distance is outside the model. The model surface is then the isosurface of the voxel field with isovalue of 0. A voxel conversion process can introduce inaccuracies proportional to the voxel size. In some embodiments, the voxel size can be chosen so that any potential inaccuracies introduced are less than the resolution of a subsequent physical manufacturing process. For example, a voxel size of 250 microns can be chosen in some embodiments. Other suitable voxel sizes can also be chosen, for example in some embodiments. Conversion back to triangular mesh can be done with a standard method of extracting isosurfaces as triangular meshes from voxel fields known in the art. A second step can include removing—aka filling— the undercut regions.

During the voxel conversion process, an additional limit that the model must first be rotated such that the insertion direction aligns with the negative z-axis can be imposed. In the following "above", "below" indicate positive and negative shifts in the z-axis, respectively. A voxel is an undercut region if it:

(1) Has a positive value (outside the mesh)
(2) Has some voxel above it with a negative value (inside the mesh)

In other words, if the voxel is air and above it lies some material (where "above" is in the axis of insertion), then it must be an undercut with respect to that axis.

The next step can include walking the voxel representation from bottom to top. Once a voxel is identified as an undercut region, to fill it, its value is set to a negative value, making the voxel an inner region of the mesh. The corresponding voxels are changed so they are no longer part of the air but part of the mesh. The voxels can be converted back using the conventionally known in the art steps of marching cubes. An example of marching cubes is described in SYSTEM AND METHOD FOR THE DISPLAY OF SURFACE STRUCTURES CONTAINED WITHIN THE INTERIOR REGION OF A SOLID BODY, U.S. Pat. No. 4,710,876 assigned to General Electric Co., the entirety of which is hereby incorporated by reference. Since the digital source model was previously rotated to align the z-axis to insertion axis, the digital source model is rotated back to the original configuration.

Figure 2A:
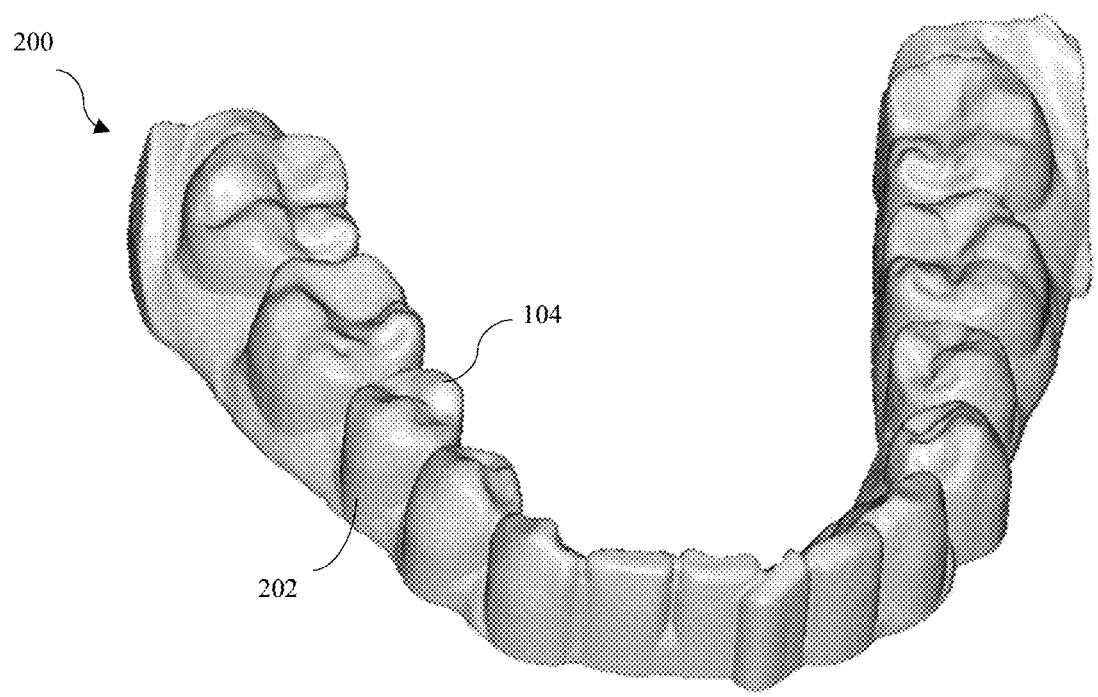
FIG. 2(a) is a perspective view of a digital non-undercut mesh.
Figure 2B:
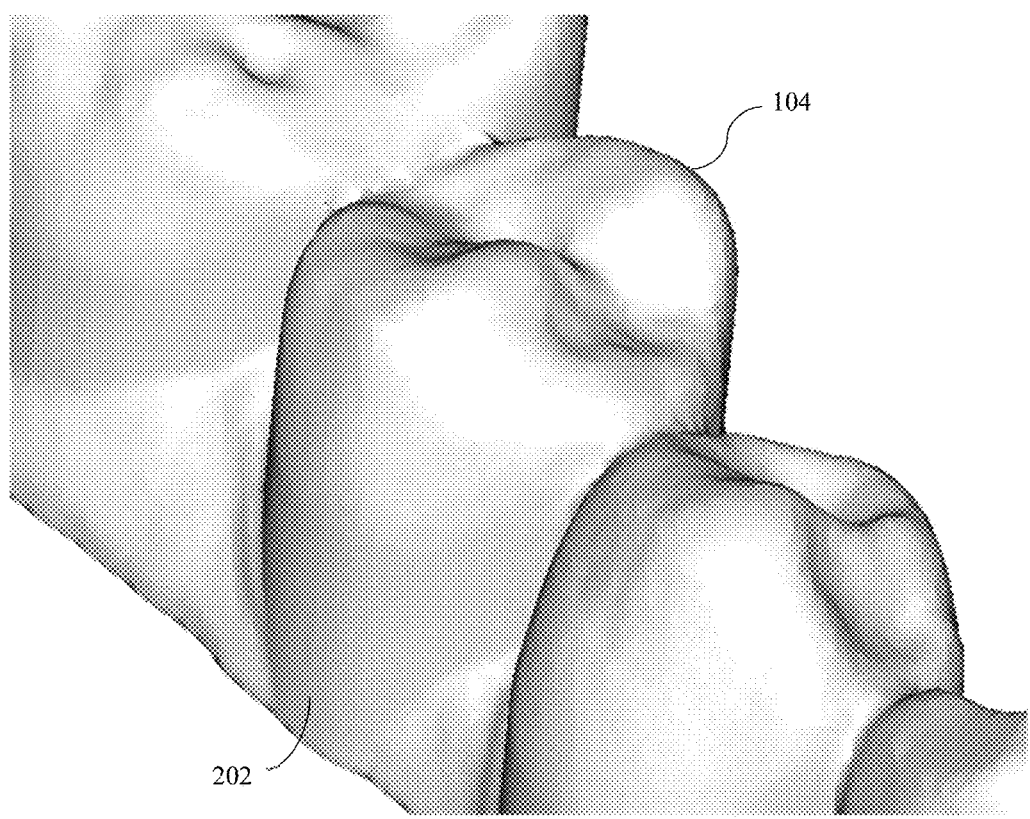
FIG. 2(b) is a perspective view of a portion of the digital non-undercut mesh.

Other techniques known in the art can be used to remove all of the undercut regions from the digital undercut mesh 100 to generate the digital non-undercut mesh. FIG. 2(A) illustrates an example of a digital non-undercut mesh 200 in which the one or more undercut regions are removed. For example, the previous undercut region for the 2nd premolar 104 is replaced with a removed undercut region 202. FIG. 2(B) illustrates a close up view of the 2nd premolar 104 and the removed undercut region 202. As illustrated in the figure, the surface mesh of the 2nd premolar 104 extends through the gingiva to eliminate any overhang or indentation or undercut, thereby producing a removed undercut region 202.

In some embodiments, the computer-implemented method can generate a digital retention mesh that includes one or more morphable regions. The digital retention mesh can be a digital mesh. The one or more morphable regions can correspond to the one or more removed undercut regions, for example in some embodiments.

In some embodiments, generating the digital retention mesh can include corresponding one or more digital source points on a digital source mesh and one or more digital target points on a digital target mesh and discarding one or more poorly corresponding pairs of points. In some embodiments, the computer-implemented method can determine undercut mesh 100 to be the digital source mesh and the non-undercut mesh to be the digital target mesh. Alternatively, in some embodiments, the computer-implemented method can determine the non-undercut mesh 200 to be the digital source mesh and the non-undercut mesh 200 can be the digital target mesh. In some embodiments, a user can assign the digital source mesh and the digital target mesh.

In some embodiments, the computer-implemented method can determine the one or more corresponding pairs of points by sampling the digital source mesh and the digital target mesh and determining the closest corresponding digital mesh point on the opposite mesh. The closest point can be determined using any suitable technique known in the art. For example, the computer-implemented method can determine the closest point by evaluating every triangle and every point to determine which is closest. Alternatively, the computer-implemented method can generate tree structure to exclude large chunks of the mesh far away from the point and evaluate only those within a certain range.

Figure 3A:
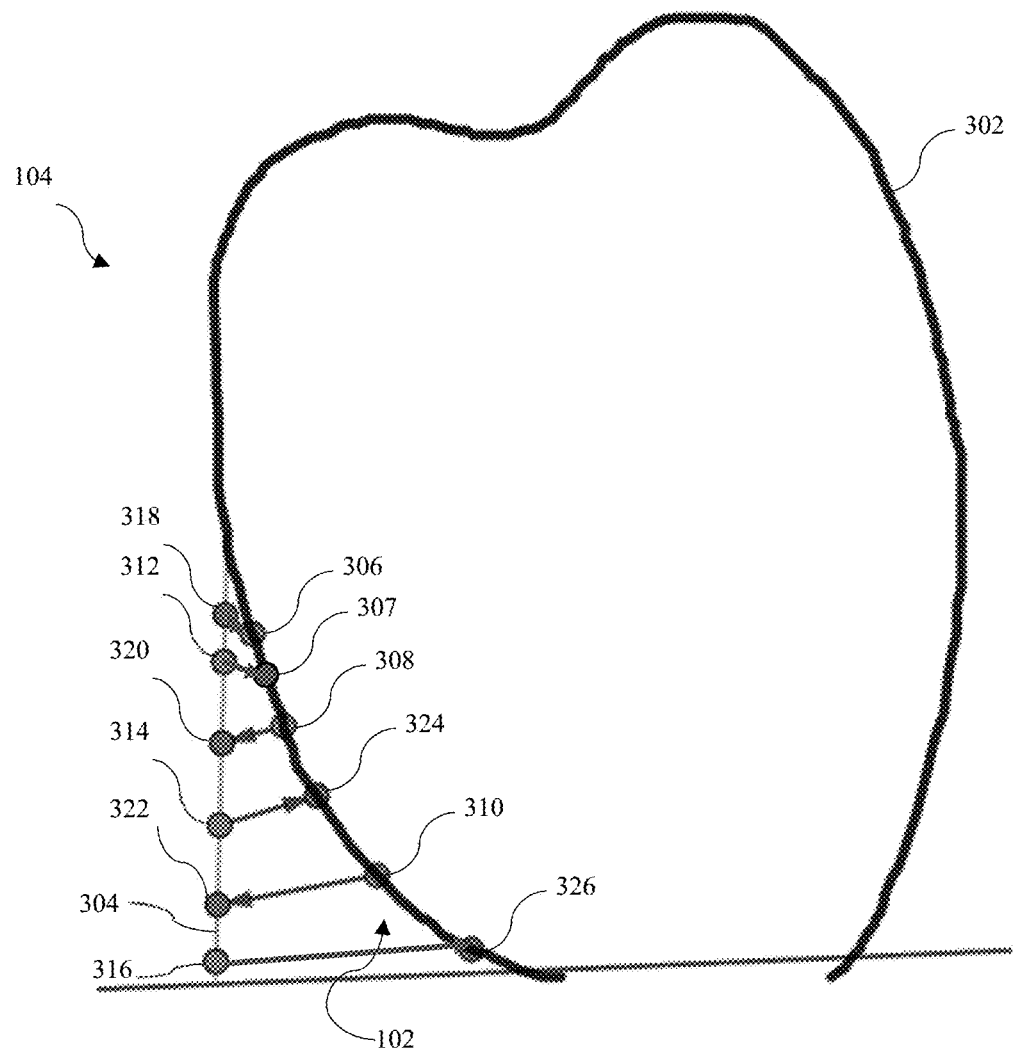
FIG. 3(A) is an orthogonal view of a portion of a sampled digital source mesh and a portion of a sampled digital target mesh.

FIG. 3(A) is an illustration of an example of sampling and determining corresponding pairs. The figure illustrates a side view of a portion of the digital source mesh 302 of the 2nd premolar 104, for example. Superimposed on the portion of the digital source mesh 302 of the 2nd premolar 104 for illustration purposes is a portion of the target mesh 304 for the 2nd premolar 104. In this example, the digital source mesh 302 is the undercut mesh 100, and the digital target mesh corresponds 304 is the non-undercut mesh 200. The portion of digital source mesh 302 of the 2nd premolar 104 illustrated in the figure includes the undercut region 102 as an example between the portion of the digital source mesh 302 and the portion of the digital target mesh 304. The portion of the target mesh 304 represents where the undercut region 102 is removed, for example. In non-undercut regions, the digital source mesh 302 and the digital target mesh 304 overlap in the example illustrated in the figure. For clarity, only sampling on a portion of the digital source mesh and a portion of the digital target mesh is shown in the figure. The computer-implemented method can sample the entire digital source mesh and the entire digital target mesh to determine corresponding pairs in some embodiments, for example. The digital source mesh and the digital target mesh are in the same coordinate system.

Figure 3B:
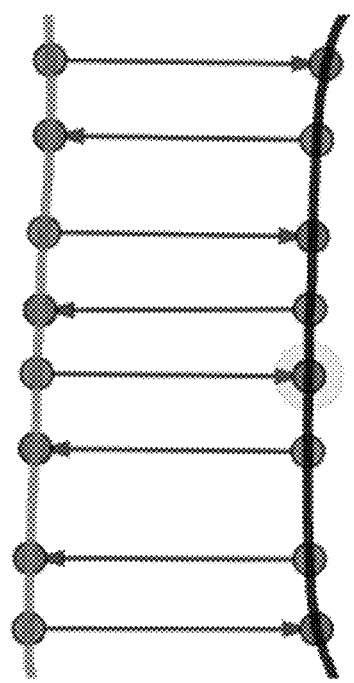
FIG. 3(B) is an orthogonal view of a portion of a sampled digital source mesh and a portion of a sampled digital target mesh with corresponding pairs.

As illustrated in the figure, the computer-implemented method can sample the digital source mesh and the digital target mesh in some embodiments. As illustrated in the figure, the computer-implemented method can sample the digital source mesh to determine first sampled source mesh point 306, second sampled source mesh point 308, and third sampled source mesh point 310, for example. As illustrated in the figure, the computer-implemented method can sample the digital target mesh to determine first sampled target mesh point 312, second sampled target mesh point 314, and third sampled target mesh point 316, for example. Additional sampled points are not shown for clarity. In some embodiments, the computer-implemented method can determine corresponding pairs. For example, for every sampled digital source point, the computer-implemented method can determine a corresponding digital target point, and for every sampled digital target point, the computer-implemented method can determine a corresponding digital source point, for example. In the figure, for example, the computer-implemented method can determine for sampled first digital source mesh point 306, sampled second digital source mesh point 308, and sampled third digital source mesh point 310, a corresponding first digital target mesh point 318, a corresponding second digital target mesh point 320, and a corresponding third digital target mesh point 322, respectively. Similarly, for example, the computer-implemented method can determine for sampled first digital target mesh point 312, sampled second digital target mesh point 314, and sampled third digital target mesh point 316, a corresponding first digital source mesh point 307, a corresponding second digital source mesh point 324, and a corresponding third digital source mesh point 326, respectively. FIG. 3(B) illustrates another example of different digital source mesh points and digital target mesh points corresponding together. The sampled digital mesh points appear at the start of the arrows which point to the sampled points' corresponding digital mesh points on the other mesh.

The number of corresponding pair points can be based on a user-selectable sampling density value in some embodiments, for example. In some embodiments, the computer-implemented method can sample uniformly. In some embodiments, the sampling density can be adjusted to sample at a greater density in undercut regions and/or other regions of interest, and the sampling may not be uniform over entire digital source mesh and/or digital target mesh. In some embodiments, the sampling density can be tuned. For example, the sampling density can be reduced to lessen the computational time necessary to determine corresponding pairs with the tradeoff being a reduction in sampling fidelity. The sampling density can be increased to improve sampling fidelity with the tradeoff being increased computational time to determine corresponding pairs, for example. A sampling frequency of one over the square of the inaccuracy threshold can be used in some embodiments, for example. For example, if the inaccuracy threshold is 10 microns, the computer-implemented method would sample 1 point over every 10*10=100 square microns.

Figure 4A:
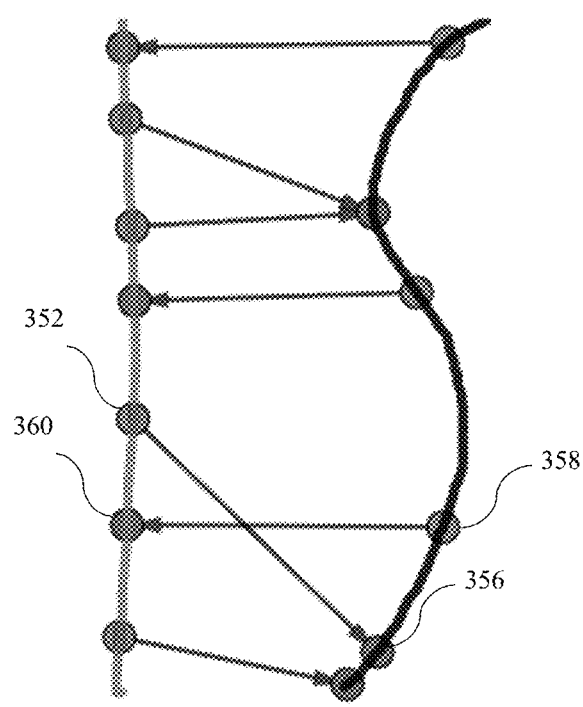
FIG. 4(a) is an orthogonal view of a portion of a sampled digital source mesh and a portion of a sampled digital target mesh with a poorly corresponding pair.

In some embodiments, the computer-implemented method can discard one or more poorly corresponding pairs of points. As illustrated in FIG. 4(A), some pairs may correspond poorly. For example, sampled digital mesh point 352 can correspond to corresponding digital mesh point 356. This can result in a poorly corresponding pair since its correspondence crosses a correspondence between sampled digital mesh point 358 and its corresponding digital mesh point 360.

Figure 4B:
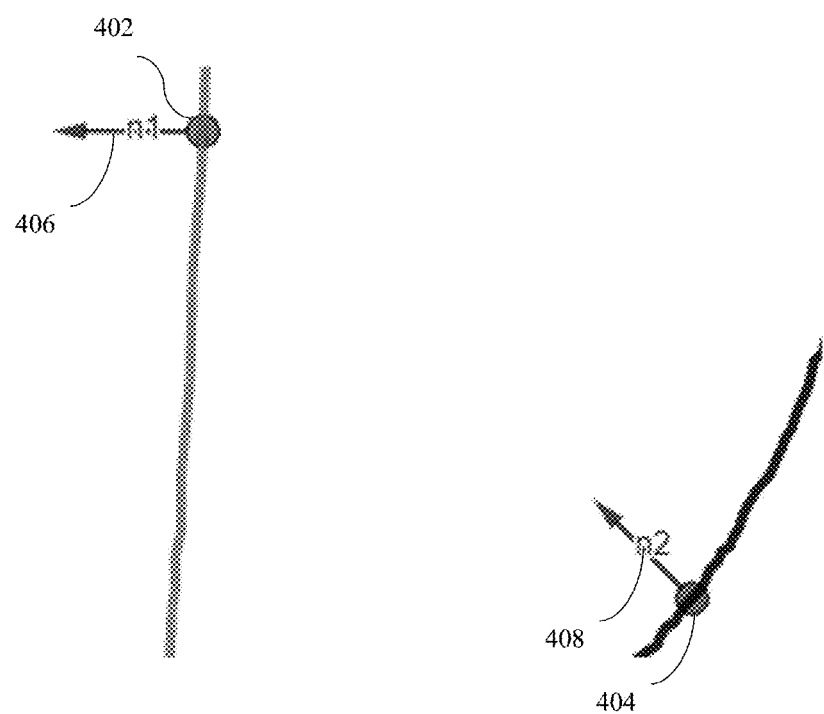
FIGS. 4(b) and 4(c) are orthogonal views illustrating a poorly corresponding pair.

In some embodiments, the computer-implemented method can determine a poor correspondence as one in which a correspondence angle between the normals to the surfaces of the points exceeds a user-selectable correspondence angle threshold. FIG. 4(B) illustrates an example of corresponding pair with a sampled digital mesh point 402 and its corresponding digital mesh point 404. The computer-implemented method can determine a digital sample point normal 406 of sampled digital mesh point 402 with respect to the digital mesh surface polygo on which it resides. The computer-implemented method can determine the corresponding digital mesh point normal 408 of corresponding digital mesh point 404 with respect to the digital target surface polygon on which it resides.

Figure 4C:
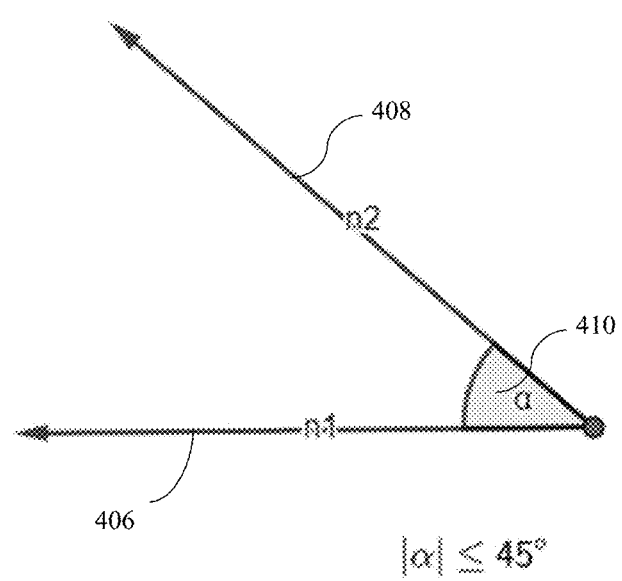

The computer-implemented method can then determine a correspondence angle 410 between the sampled digital mesh point normal 404 and its corresponding digital mesh point normal 408 in some embodiments, for example as illustrated in FIG. 4(C). While any correspondence angle threshold can be set/configured, in some embodiments a correspondence angle threshold value of 45 degrees can be used, for example. FIG. 4(C) illustrates determining the correspondence angle. The computer-implemented method can, for each corresponding pair, determine the correspondence angle 410 and, if the correspondence angle exceeds the correspondence angle threshold value, then drop the corresponding pair. In some embodiments, the correspondence angle threshold is a configurable value.

In some embodiments, the computer-implemented method can determine a correspondence weight by dotting the two triangles' normal vectors together and assign the value as the weight of the correspondence pair. A weight of 1 means the normal vectors had a 0 degree difference (facing the same direction) and a weight of 0 means the normal vectors had 180 degree difference (facing opposite directions). The computer-implemented method can discard any correspondence pairs which have more than 45 degree difference in their triangle normal in some embodiments, for example. Other angles can be used to determine which corresponding pairs to discard.

The computer-implemented method can in some embodiments, generate the digital retention mesh based on the corresponding pairs of digital source mesh points and digital target mesh points. For example, in some embodiments, the computer-implemented method can for each corresponding pair, generate a portion of the digital retention mesh.

The computer-implemented method can for each corresponding pair, determine a linear combination of vertices of one or more digital source mesh points. The one or more digital source mesh points can be sampled digital mesh points or corresponding digital mesh points on the digital source mesh, for example.

Figure 5:
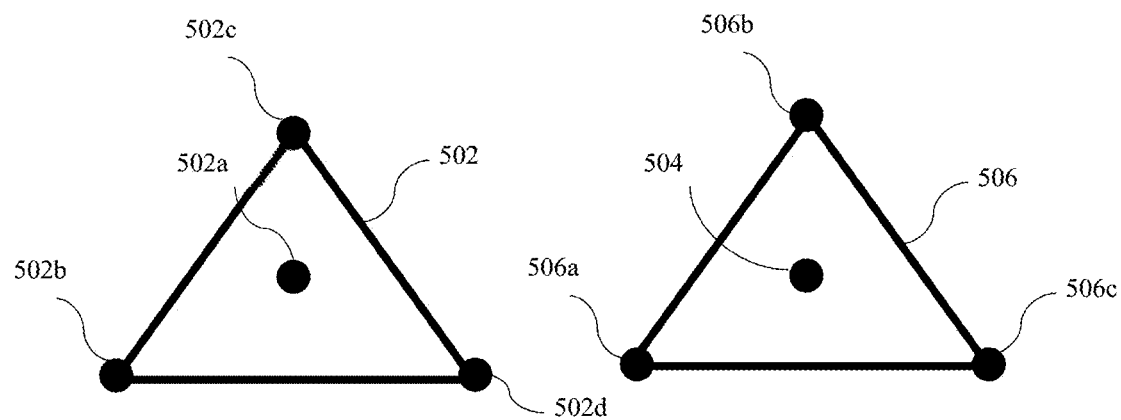
FIG. 5 is an illustration of a portion of a retention mesh generated from corresponding pairs.

For a digital source mesh made of triangles, for example, the computer-implemented method can determine the linear combination of vertices as barycentric coordinates based on and/or determined by digital source mesh point vertices. For example, as illustrated in FIG. 5, the computer-implemented method can determine digital source mesh vertex $V_1$ 502b, digital source mesh vertex $V_2$ 502c, and digital source mesh vertex $V_3$ 502d, for example from digital source mesh point $S_o$ 502a on the digital source mesh triangle 502. Each digital source mesh point vertex can include coordinates x, y, and z indicating its position in the digital source mesh. The computer-implemented method can determine the barycentric digital source mesh point vertices for digital source mesh point 502a $S_o$ as $S_o = \alpha V_1 + \beta V_2 + (1-\alpha-\beta) V_3$.

As also illustrated in FIG. 5, the digital source mesh point $S_o$ 502a can have a corresponding digital target mesh point $S_t$ 504. In some embodiments, the computer-implemented method can determine a corresponding pair constraint between the points in each corresponding pair and can generate one or more retention mesh vertices based on one or more corresponding pair constraints for example. The corresponding pair constraints can determine where vertices of the digital target mesh point $S_t$ 504 should be generated in the digital retention mesh based on the known vertices of the digital source mesh point $S_o$ 502a For example, in some embodiments, the computer-implemented method can determine retention mesh vertex $T_1$ 506a, retention mesh vertex $T_2$ 506b, and retention mesh vertex $T_3$ 506c for the digital target mesh point 504 $S_t$ that corresponds to the digital source mesh point $S_o$ 502a. The computer-implemented method can generate a corresponding pair constraint by determining retention mesh vertex $T_1$ 506a, retention mesh vertex $T_2$ 506b, and retention mesh vertex $T_3$ 506c from $\alpha T_1 + \beta T_2 + (1-\alpha-\beta) T_3 = S_t$ for each corresponding pair of digital source mesh points and digital target mesh points in some embodiments, where $\alpha$ is a digital source mesh vertex coefficient for $V_1$, $\beta$ is a digital source mesh vertex coefficient for $V_2$, and $1-\alpha-\beta$ is the digital source mesh vertex coefficient for $V_3$.

In some embodiments, the computer-implemented method can apply a weighting factor to the corresponding pair constraint, so that a weighted corresponding pair constraint is $w*[\alpha T_1 + \beta T_2 + (1-\alpha-\beta) T_3] = w*S_t$, for example. In some embodiments, the weighting factor can include the correspondence weight, c described previously. In some embodiments, the weighting factor can include a correspondence binding constant k. The correspondence binding constant k can act as localizing factor to keep two points in proximity to each other, for example. This can help provide accurate mapping and that the digital source mesh points can be morphed to the digital target mesh point in the digital retention mesh, for example. In some embodiments, the computer-implemented method can multiply the correspondence weight with the correspondence binding constant k to determine the weighting factor w. Although any correspondence binding constant value can be used, in some embodiments the corresponding binding constant can be, for example 4.

In some embodiments, the computer-implemented method can additionally generate edge constraints between one or more adjacent vertices of the digital source mesh as illustrated in FIG. 5.

The edge constraint between can be expressed as, for example, $e*(V_1-V_3)=0$ between the digital source mesh vertex $V_1$ 502b and digital source mesh vertex $V_3$ 502d with edge binding constant e. The edge constraint can be applied to one or more edges between pairs of vertices in the digital source mesh. The edge binding constant k can act as localizing factor to keep two points in proximity to each other, for example. Any edge binding constant value can be used. In some embodiments, the edge binding constant can be, for example, 4. The computer-implemented method can apply the edge binding constant to one or more edges in the digital source mesh.

In some embodiments, the corresponding binding constant and the edge binding constants can be set as one or more user-selectable or input graphical user interface field(s) shown on a display. Alternatively, the constants can be loaded from a configuration file or received from an external program, for example.

In some embodiments, the computer-implemented method can determine the digital retention mesh vertices based on the correspondence constraints and the edge constraints for every corresponding pair of digital source mesh points and digital target mesh points. In some embodiments, the computer-implemented method can generate a linear system of matrices AX=B and add every weighted corresponding pair constraint and every edge constraint to the linear system. For example, the computer-implemented method can generate a source vertex matrix A and a target matrix B. For each weighted corresponding pair constraint, the computer-implemented method can add a row of the weighted corresponding pair constraint's digital source mesh vertices coefficients to A and add $S_t$ to target matrix B in the same row. For example, the computer-implemented method can for the weighted corresponding pair constraint add to source vertex matrix A:

$$\begin{array}{cccc} V_1 & V_2 & V_3 & \ldots V_n \end{array}$$
$$\begin{bmatrix} w*\alpha & w*\beta & w*(1-\alpha-\beta) & \ldots & . \\ . & . & . & \ldots & . \\ . & . & . & \ldots & . \end{bmatrix}$$

since these are the weighted coefficients corresponding to digital source mesh vertices $V_1$, $V_2$, and $V_3$. The computer-implemented method also adds to target matrix B in the same row the value of $S_t$ since it is the corresponding pair point:

$$\begin{bmatrix} S_t \\ . \\ . \end{bmatrix}$$

For each edge constraint, the computer-implemented method can add a row of the edge constraint's digital source mesh vertices coefficients to source vertex matrix A. For example, in another row, the computer-implemented method can for the edge constraint add to source vertex matrix A:

$$\begin{array}{cccc} V_1 & V_2 & V_3 & \ldots V_n \end{array}$$
$$\begin{bmatrix} w*\alpha & w*\beta & w*(1-\alpha-\beta) & \ldots & . \\ e*1 & 0 & e*(-1) & \ldots & . \\ . & . & . & \ldots & . \end{bmatrix}$$

since these are the values corresponding to digital source mesh vertices $V_1$ and $V_3$ ($V_2$ is set to 0 because it is not part of the edge). The computer-implemented method also adds to target matrix B in the same row the value of 0 since the edge constraint between the digital source vertices $V_1$ and $V_3$ does not involve the digital target mesh point $S_t$:

$$\begin{bmatrix} St \\ 0 \\ . \end{bmatrix}$$

The computer-implemented method can determine all weighted corresponding pair constraints and edge constraints and add each to the linear system as described. In some embodiments, the linear system AX=B may be overdetermined because the number of rows of A (or corresponding pair constraints) can exceed the number of variables, which can result in no determinable solution for X. The computer-implemented method can in some embodiments, minimize the linear system AX=B by applying the least squares solution known in the art. For example, in some embodiments, the computer-implemented method can minimize the sum of the squared differences $\|AX-B\|^2$. Other techniques for solving overdetermined systems can also be used. Each row of X can be a particular retention mesh vertex such as either retention mesh vertex $T_1$ 506a, retention mesh vertex $T_2$ 506b, or retention mesh vertex $T_3$ 506c, etc. for example.

The computer-implemented method can in this manner, generate the digital retention mesh vertices based on corresponding pairs of digital source mesh points and digital target mesh points in some embodiments, for example. Using the vertices of the digital source mesh point $S_o$ 502a, the computer-implemented method can generate retention mesh vertex $T_1$ 506a, retention mesh vertex $T_2$ 506b, and retention mesh vertex $T_3$ 506c in the digital retention mesh triangle 506 for the corresponding digital target mesh point $S_t$ 504 by generating one or more constraints and solving a linear system as described. Because the generated vertices in the digital retention mesh 506 are based on a correspondence between the digital source mesh point 502a and the digital target mesh point 504 in some embodiments, the digital retention mesh triangle 506 generated can have the same topology as the digital source mesh but have an initial retention mesh shape of the digital target mesh in some embodiments in some embodiments for example. The topology can refer to vertices and their connections with one another. In some embodiments, generating the digital retention mesh as described can map the digital source mesh vertex $V_1$ 502b, digital source mesh vertex $V_2$ 502c, and digital source mesh vertex $V_3$ 502d to retention mesh vertex $T_1$ 506a, retention mesh vertex $T_2$ 506b, and retention mesh vertex $T_3$ 506c, respectively, for example.

Generating all retention mesh vertices in this manner can generate a digital retention mesh topology that can be the same as the topology of the source mesh, in some embodiments, for example. Because of the shared topology between the digital retention mesh and the digital source mesh, the computer-implemented method can morph a digital retention mesh shape between the digital target mesh shape and the digital source mesh shape, for example. In the example, because the digital source mesh 302 is the undercut mesh 100, the digital source mesh 302 includes one or more undercut regions. In the example, because the digital target mesh 304 is the non-undercut mesh 200, the digital target mesh 304 lacks the one or more undercut regions. The generated retention mesh can in some embodiments provide a map between the one or more undercut regions and the one or more removed undercut regions. For example, in some embodiments, the digital retention mesh vertices can map to corresponding digital source mesh vertices. The digital retention mesh can thus include one or more morphable regions, the one or more morphable regions corresponding to the one or more removed undercut regions, for example. This can allow morphing at least a portion of the removed undercut region(s), for example to provide one or more retention features. Morphing can include adding, removing, or altering at least a portion of the removed undercut region(s).

Figure 6:
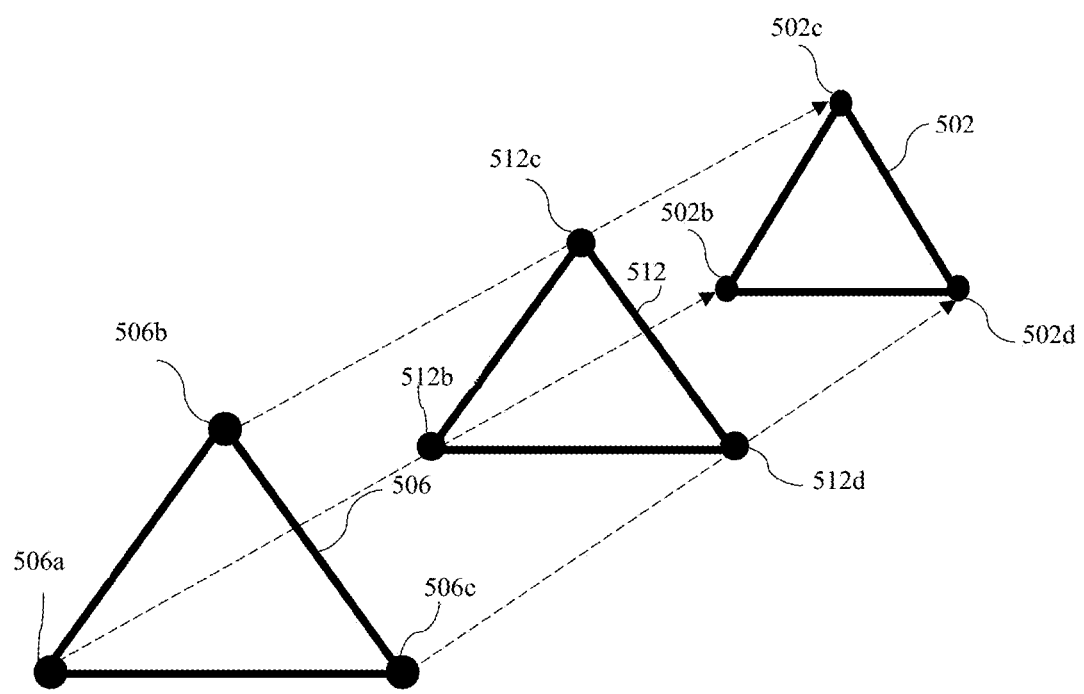
FIG. 6 is an illustration of interpolation.

In some embodiments, the computer-implemented method can modify a portion of the one or more morphable regions. For example, the computer-implemented method can receive one or more morph regions and a morph amount. In some embodiments, the computer-implemented method can also receive a morph type, for example. In some embodiments, the morph type can specify, for example, adding or removing. In some embodiments, the computer-implemented method can determine one or more retention mesh vertices corresponding to the one or more morph regions. In some embodiments, the computer-implemented method can interpolate one or more new retention mesh vertices to locations between one or more original retention mesh vertices locations and one or more corresponding digital source mesh vertices locations. In some embodiments, the computer-implemented method can interpolate by new vertex=(1−t)*source_point+t*original_retention_mesh_vertex, where t is between 0 and 1, where 1 is the maximum interpolation amount. The maximum interpolation amount can be, for example, moving the one or more retention mesh vertices completely to the location of their corresponding digital source mesh vertices (t=1). FIG. 6 illustrates an example of modifying a portion of the one or more morphable regions by interpolation. As illustrated in the figure, the computer-implemented method can interpolate retention mesh vertex $T_1$ 506a, retention mesh vertex $T_2$ 506b, and retention mesh vertex $T_3$ 506c all the way to their respective source mesh vertices, digital source mesh vertex $V_1$ 502b, digital source mesh vertex $V_2$ 502c, and digital source mesh vertex $V_3$ 502d positions, respectively, for example. Alternatively, the computer-implemented method can interpolate the digital retention mesh vertex $T_1$ 506a, retention mesh vertex $T_2$ 506b, and retention mesh vertex $T_3$ 506c to an interpolated mesh vertex $I_1$ 512a, interpolated retention mesh vertex $I_2$ 512b, and interpolated retention mesh vertex $I_3$ 512d, respectively, based on the morph amount (and morph type in some embodiments) received by the computer-implemented method to determine the digital interpolated mesh triangle 512.

In some embodiments, a digital retention mesh shape may not completely match the digital target mesh shape in some regions, for example. This can arise due to a lower sampling density value used to generate the digital retention mesh or because of large differences between the digital source mesh shape and the digital target mesh shape in some cases, for example. These slight variances in some regions can be acceptable if they are at or below maximal distance between any point on the digital target mesh to its closest point on the digital retention mesh in some embodiments for example. For example, the acceptable maximal distance can be based on the resolution of any subsequent manufacturing process. For example, if a manufacturing process has a resolution of 50 microns, then a maximal distance of 20 micron can be acceptable since it is below the resolution of the manufacturing process and therefore will not degrade it. In some embodiments the sampling density can be suitably increased to improve matching between the digital retention mesh shape and the digital target mesh shape in some or all regions, for example.

In some embodiments, the computer-implemented method can display the digital retention mesh with one or more morphable regions, the one or more morphable regions including one or more removed regions from a digital source model, receive a selected morph region of the digital retention mesh and modify at least a portion of the shape of the selected morph region to the digital retention mesh. In some embodiments, the digital retention mesh topology is the same as the digital source mesh topology. The computer-implemented method can morph the digital retention mesh shape by interpolating between the digital source mesh shape and the digital target mesh shape in some embodiments, for example. An initial shape retention mesh shape displayed to the user can be that of the digital source mesh, the digital target mesh, or any interpolated digital mesh shape in between. The user can morph by adding to or removing from the morphable region up to the interpolation maximum on one end and the source shape on the other end.

Figure 7A:
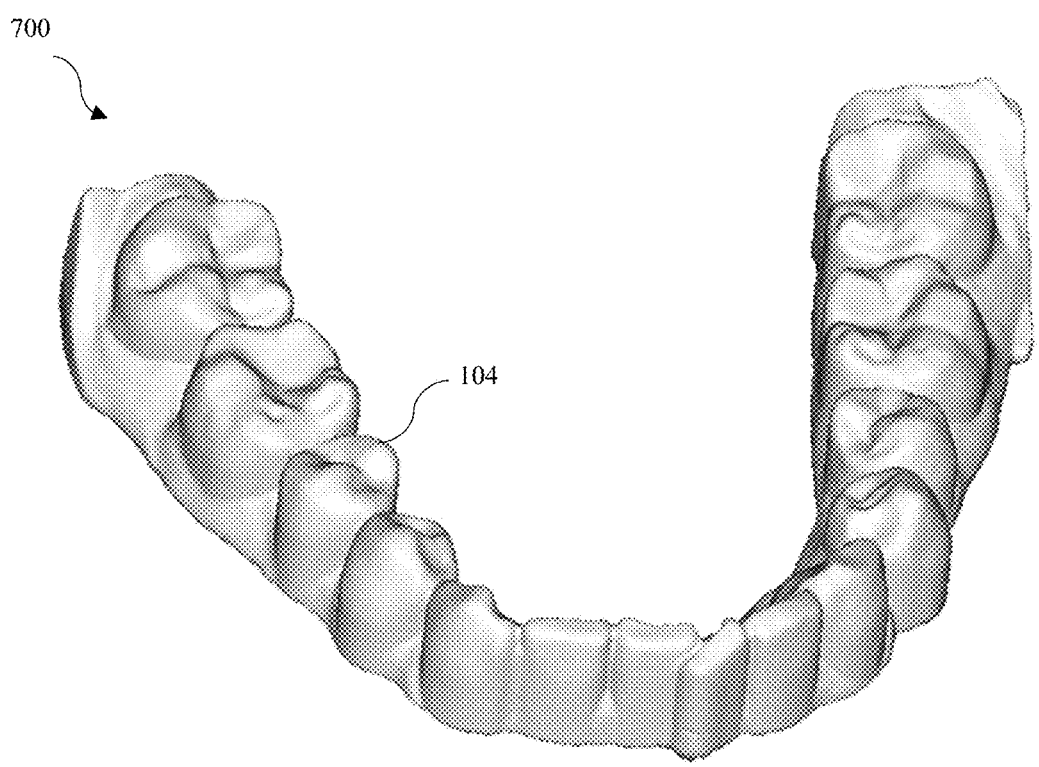
FIG. 7(a) is a perspective view of a digital retention mesh.
Figure 7B:
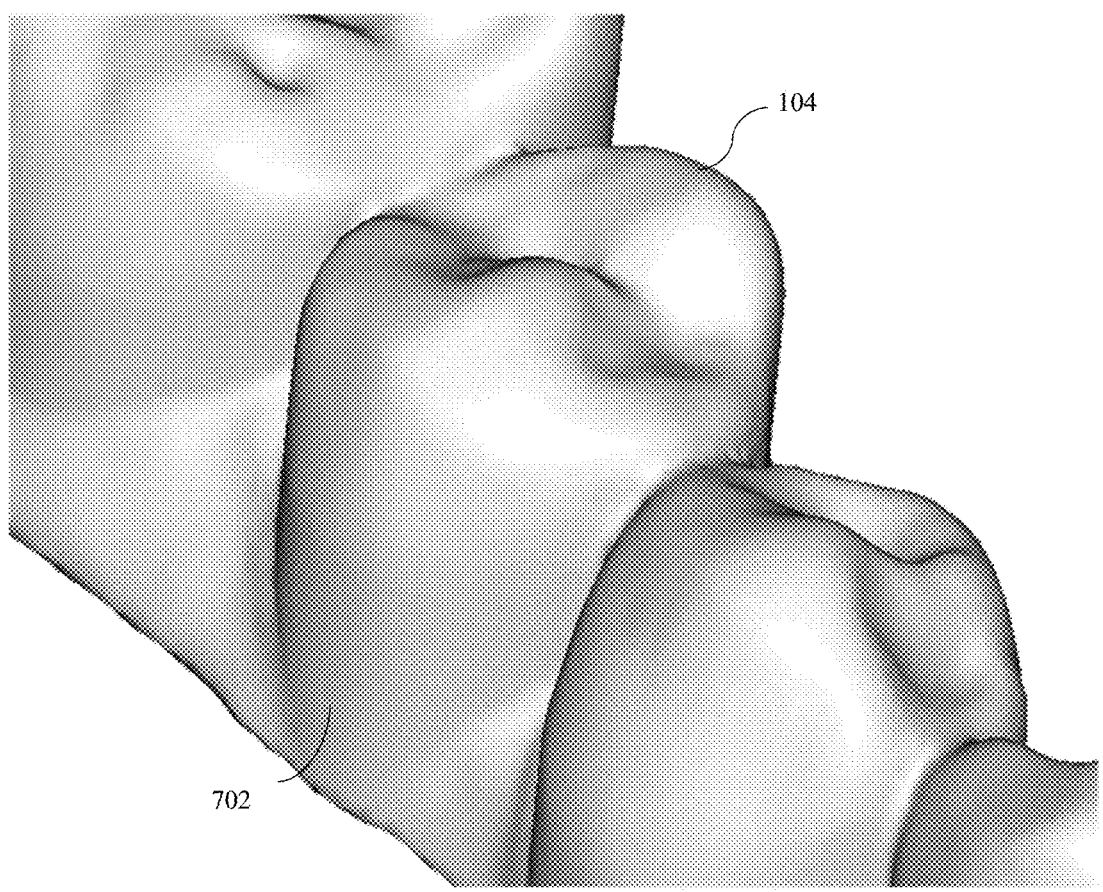
FIG. 7(b) is a perspective view of a portion of the digital retention mesh.

FIG. 7(a) illustrates one example of a digital retention mesh 700 that includes the $2^{nd}$ premolar tooth 104 that can be displayed on a display, for example. FIG. 7(b) shows a close up of the $2^{nd}$ premolar tooth 104. The digital retention mesh 700 can include one or more morphable regions 702 which, as discussed previously, can correspond to the one or more removed undercut regions 202 (See FIG. 2) from the digital undercut mesh 100 (See FIG. 1(a)), for example in some embodiments.

In some embodiments, the computer-implemented method can receive a selected morph region of the digital retention mesh. The selected morph region can be specified by a user, for example, through an interactive graphical user interface (GUI) displayed to the user. The GUI can provide one or more interactive GUI features through which the user can specify the selected morph region, the amount to modify, and the morph type.

Figure 8A:
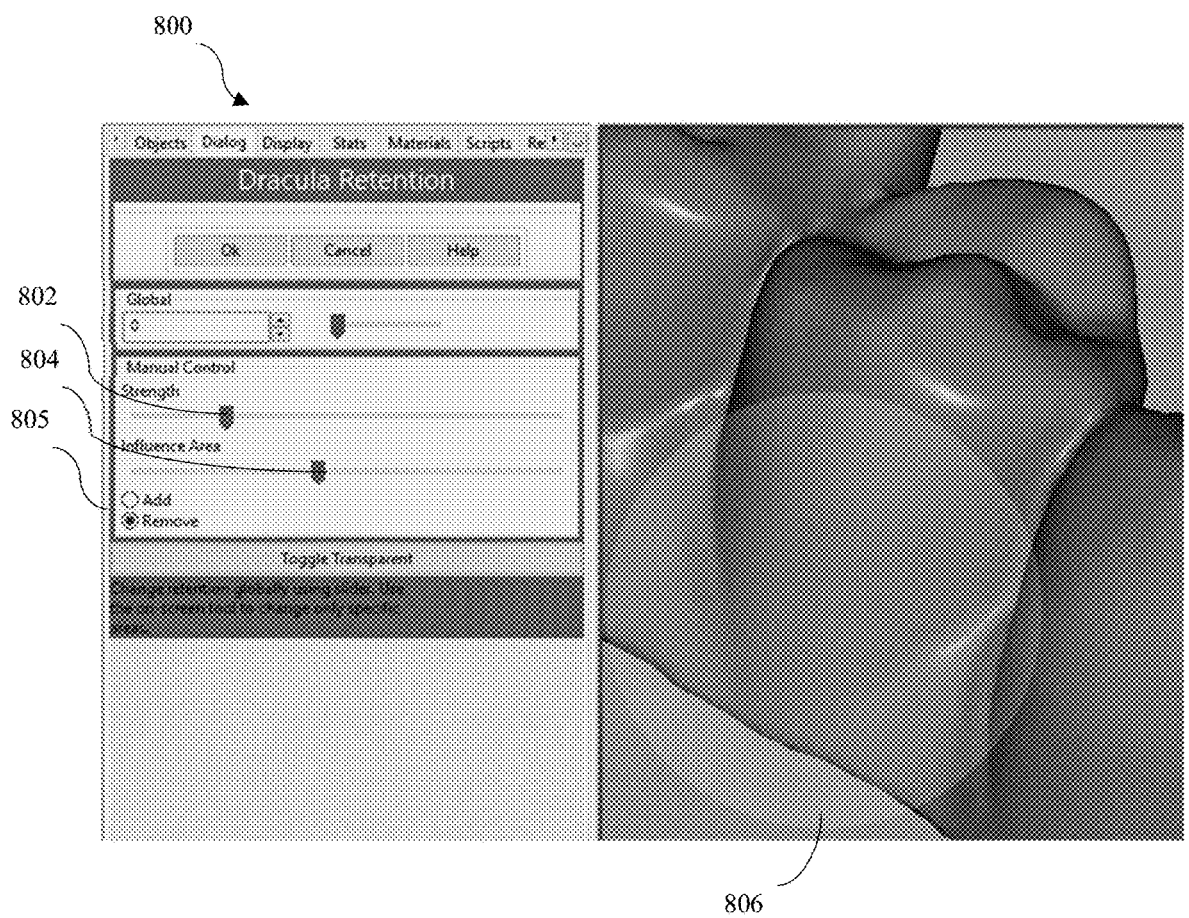
FIG. 8(a)-8(c) are orthogonal views of a Graphical User Interface.
Figure 8B:
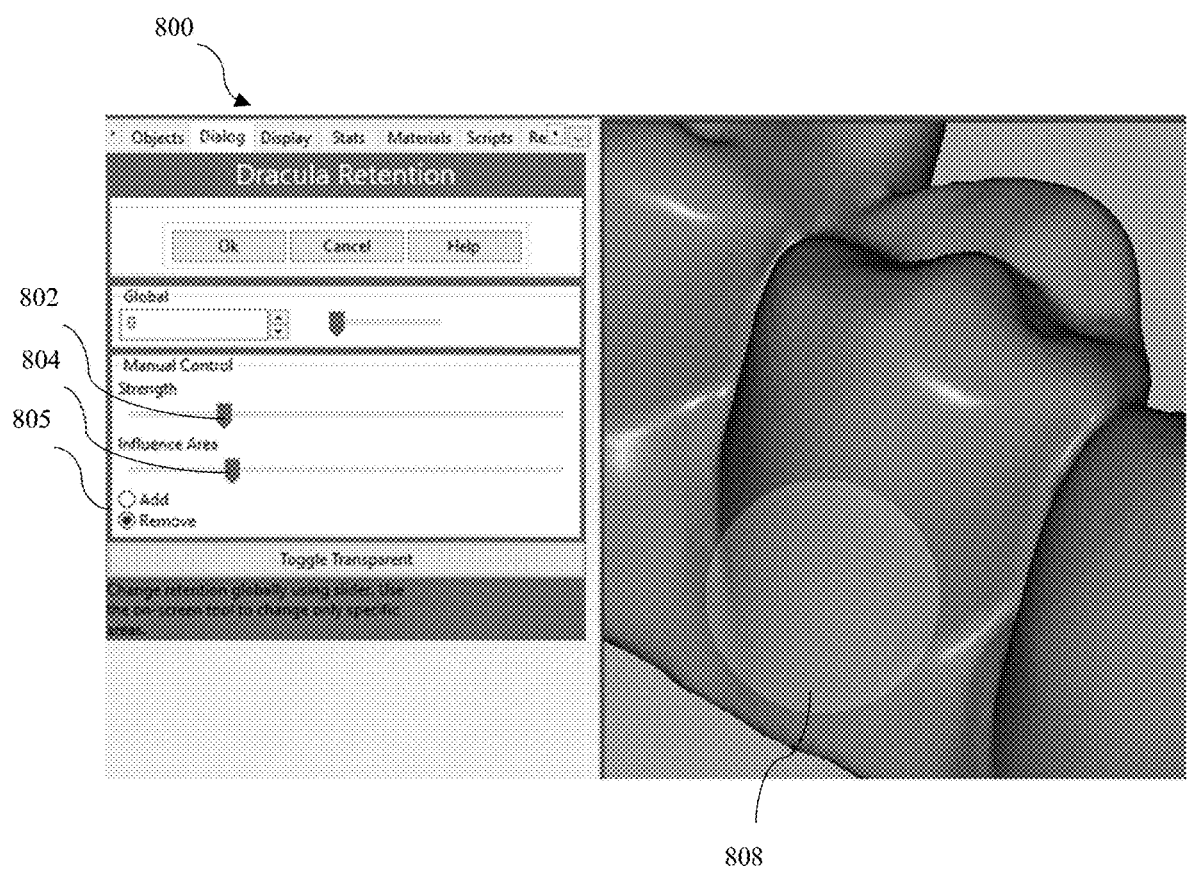

As illustrated in FIG. 8(a), for example, in some embodiments, the computer-implemented method and/or system can provide one or more manual control GUI features on a GUI 800 that can include a strength control feature 802, an influence area control feature 804 as well as options to add or remove 805 the one or more morphable regions. The strength control feature 802 can determine the rate of interpolation described previously. A greater strength control feature value increases the rate of adding or removing the morphable region. This can help the user select the amount of the selected morph region 806 to modify. The influence area control feature 804 can determine the size of the selected morph region 806, for example. A greater area control feature value can increase the size of the selected morph region 806 for selection, for example. A smaller area control feature value can decrease the size to a smaller morph region 806 for selection, for example. FIG. 8(b) illustrates a smaller selected morph region 808. In some embodiments, a GUI feature such as Add/Remove buttons 805 can determine the morph type, for example.

Figure 8C:
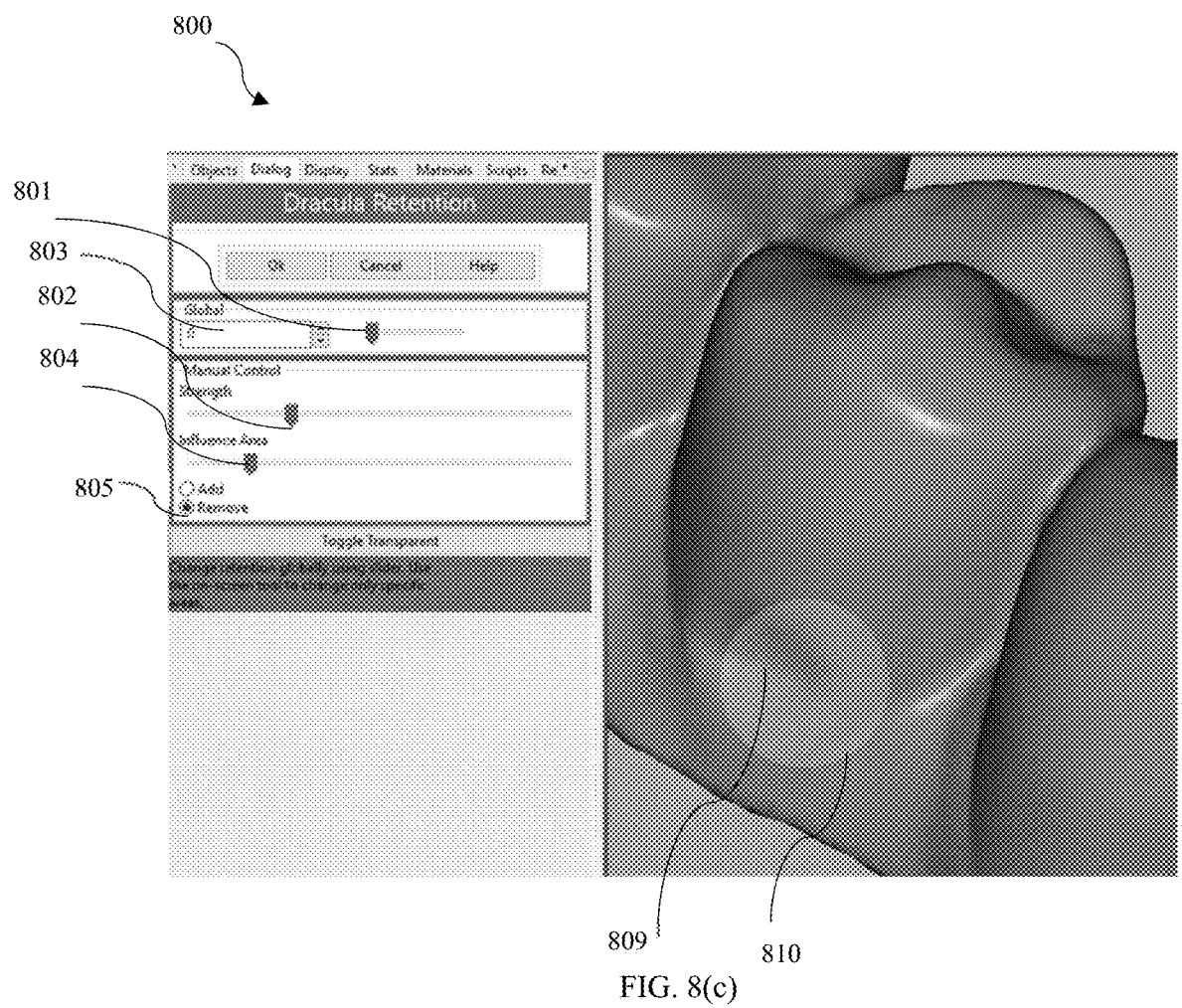

FIG. 8(c) illustrates removing the morphable region 809 on a final selected morph region 810. The user can use an input device such as, for example, a mouse or finger to indicate selected final morph region 810 in some embodiments. The computer-implemented method can apply the influence area control feature 804 to determine and display the size of the final selected morph region 810 in some embodiments, for example. In some embodiments, the computer-implemented method and/or system can display the location and size of the final selected morph region 810 as the user hovers the mouse pointer over a region on the displayed digital retention mesh.

When the user presses an input such as a mouse button, for example, the computer-implemented method and/or system can receive the vertices of the digital retention mesh falling within the selected morph region, for example. As illustrated in FIG. 8(c), The computer-implemented method and/or system can apply the strength control feature 802 value and determine the rate of interpolation to morph the final selected morph region 810, and the type of morph to apply (adding, removing) for example, and continue morphing the digital retention mesh until the user stops pressing the input. The morphing can add to or remove from the final selected morph region 810 based on the Add/Remove GUI control features 805 in some embodiments, for example. The computer-implemented method can receive the vertices for the final selected morph region 810 of the digital retention mesh and interpolate each selected retention mesh vertex toward its corresponding digital source mesh vertex or vice versa. The computer-implemented method can then modify the shape of the digital retention mesh by interpolating the digital retention mesh vertices toward or away from their corresponding source mesh vertices in some embodiments for example. As illustrated in FIG. 8(c), the computer-implemented method can morph or modify the shape of the digital retention mesh, to provide morphed retention region 809 for example, by modifying at least a portion of the removed undercut for the final selected retention region 810, for example.

In some embodiments, the computer-implemented method can provide a GUI feature to perform global morphing of all morph regions, for example. In some embodiments, the computer-implemented method can provide a GUI feature for global morphing 801, for example, to specify the exact global morphing to perform between 0 and 1, for example, where 1 is the maximum morph of removed regions corresponding to the shape of the digital source mesh that can allow a user to morph all morphs at once by the amount selected. In some embodiments, an input field 803 can be used to specify the amount to morph globally. In some embodiments, the computer-implemented method can receive the amount to morph globally and then interpolate all digital retention mesh vertices to their corresponding digital source mesh vertices by the amount selected, for example. In some embodiments, the computer-implemented method can receive a morph type indicating whether the morphing adds or removes morphable regions globally.

Once the computer-implemented method receives the selected morph region, it can determine the digital retention mesh vertices falling within the selected morph region. Upon receiving the morph amount and morph type (add or remove, for example), the computer-implemented method can morph or modify the selected morph region by interpolating the digital retention mesh vertices falling within the selected morph region toward or away from their respective corresponding digital source mesh vertices.

GUI features are described herein as examples; any other GUI features known in the art for selecting an area of a digital mesh can be used. Common control and selection features known in the art can be utilized to select specific vertices of the digital retention mesh.

In some embodiments, the strength control feature 802, influence area control feature 804, and global control feature 801 can include graphical sliders, for example, to adjust their respective application, for example.

In some embodiments, for example, one or more features as disclosed herein can allow a user using the computer-implemented method to modify the digital retention mesh at specific regions to influence, for example, how the appliance can be inserted and/or removed. In some embodiments, for example, the user can modify the morphable regions to provide a pivotal motion to add/remove a dental appliance to/from patient dentition.

In some embodiments, one or more features as disclosed herein can allow a user using the computer-implemented method to change specific areas such as the morphable regions to provide a comfortable fit, for example. In some embodiments, one or more features as disclosed herein can allow a user using the computer-implemented method to modify specific morphable regions like posterior teeth vs anterior that leave a "too tight" feeling. In some embodiments, one or more features as disclosed herein can allow a user using the computer-implemented method to morph morphable regions on the digital retention mesh to provide a retention feature at a sturdy, ie. non-fragile area of an object, for example. In some embodiments, one or more features as disclosed herein can allow a user using the computer-implemented method to modify morphable regions to prevent teeth pulling out when removing a dental appliance, for example in dentition with receding gumline areas, for example.

In some embodiments, the computer-implemented method can receive regions to modify from an external source such as another program or a configuration file, for example. The external source or configuration file can, for example, specify one or more morph regions and morph amounts to automatically modify. The computer-implemented method can determine and receive the digital retention mesh vertices within the one or more morph regions and interpolate the digital retention mesh vertices based on the morph amount (and morph type in some embodiments) for the particular morph regions in some embodiments, for example.

In some embodiments, an appliance and/or mold can be generated as a negative of the digital retention mesh using conventionally known techniques such as a Boolean subtract operation. For example, the Boolean subtract operation of A–B results in model which has all the volumetric regions of A not included in B. In other words, the result has no region in common with B, but all of its regions are common with A.

In some embodiments, the computer-implemented method can generate an appliance design as a negative of the final retention mesh, with respect to some surrounding material, for example. This negative can be formed by Boolean subtract operation, which can include subtracting the digital retention mesh (B) from a surrounding digital material mesh (A). In some cases, the surrounding digital material mesh may be generated by offsetting a portion of the digital retention mesh by some given thickness, for example. The portion may be the regions above the gum line in some embodiments, for example. The thickness may be 1 mm for example, and subtracting from this surrounding digital material mesh would generate a final appliance mesh with 1 mm thickness which lays over the portion of the digital retention mesh which was offset. The surrounding digital material mesh can be designed with other constraints. For example, in some embodiments, the requirement to not sit below gum line could be an optional constraint, for example.

In some embodiments, the design of a mold can be generated by forming a digital negative using a Boolean subtract between surrounding digital material mesh (A) and retention mesh (B), for example. The surrounding digital material mesh may be any digital mesh which is to surround the digital retention mesh in some embodiments. For example, the surrounding digital material mesh may be a rectangular block. The surrounding digital material mesh may be designed with other constraints in mind. For example, the surrounding digital material mesh may have handle or screw hole features, allowing the mold to be clasped or screwed for some part of a manufacturing process which uses the mold in some embodiments.

One advantage of one or more features as disclosed in some embodiments can include, for example, accurate and smooth mapping between the digital retention mesh and the digital source mesh. This can help provide design accuracy, detail, and customizability of a mold and/or appliance for example. One advantage of one or more features such as correspondence constraints and the edge constraints as disclosed in some embodiments can include, for example, fewer errors in the digital retention mesh caused by long edges and intersecting triangles, helping provide design accuracy, detail, and customizability of a mold and/or appliance for example. One advantage of one or more features can include, for example, improved mapping accuracy between the digital retention mesh and the digital source mesh by using corresponding pairs, helping provide design accuracy, detail, and customizability of a mold and/or appliance for example. One advantage of one or more features can include, for example, improved granularity, precision, and control over the area and amount of retention feature material to re-add/modify/provide/remove, helping provide design accuracy, detail, and customizability of a mold and/or appliance for example. One advantage can include, for example, selectively restoring and/or adding back or removing interactively and in real-time one or more morphable regions, helping provide design accuracy, detail, and customizability of a mold and/or appliance for example. One advantage can include, for example, providing a morphable region that can be adjusted to a desired amount of retention that retains an object while still allowing its insertion and removal. One advantage can include, for example, utilizing already available digital source mesh and digital target mesh. One advantage can include, for example, providing a morphable region that can be adjusted to accommodate a customizable retention amount for each object. One advantage can include, for example, providing a morphable region that can be adjusted and applied to every object. One advantage can include, for example, adding the retention feature digitally, thereby improving the speed, accuracy, and customizability of the retention feature. Although certain advantages are indicated, many others are possible, and no limitation is intended by listing certain advantages.

Examples

Figure 9A:
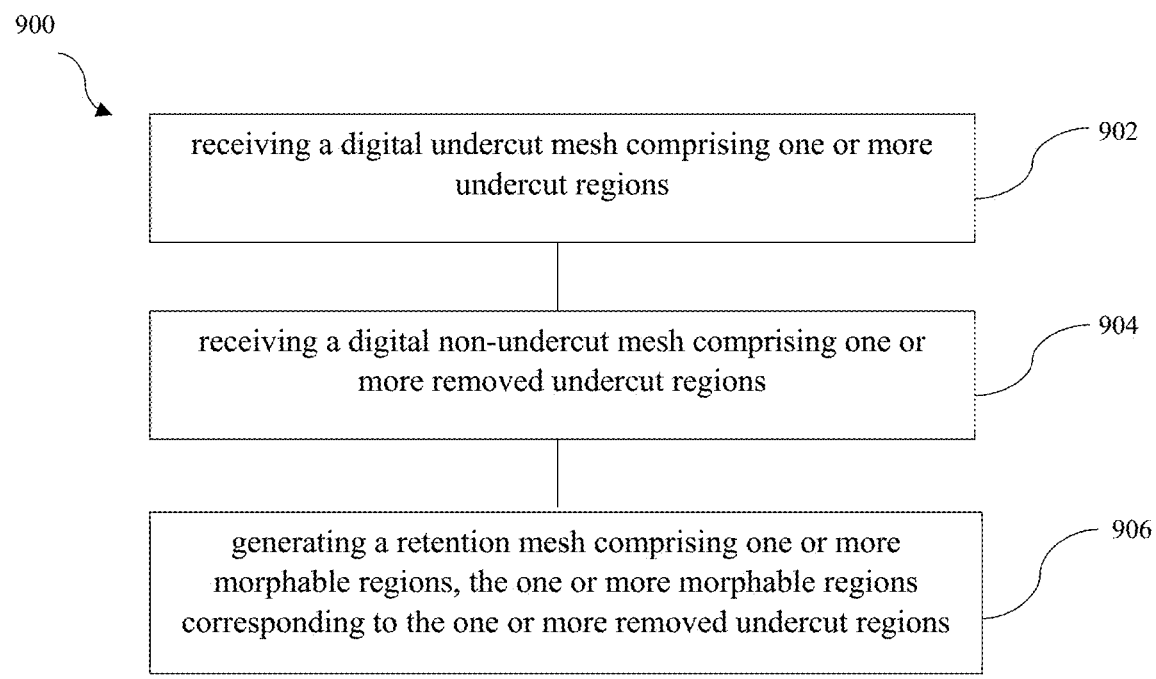
FIGS. 9(a)-9(b) are flowcharts illustrating one or more features.

Some embodiments can include a computer-implemented method of providing a digital retention feature. For example, FIG. 9(a) illustrates a computer-implemented method of providing a digital retention feature that can include: receiving a digital undercut mesh including one or more undercut regions at 902, receiving a digital non-undercut mesh including one or more removed undercut regions at 904 and generating a digital retention mesh including one or more morphable regions, the one or more morphable regions corresponding to the one or more removed undercut regions at 906.

The method can include several optional features. For example, the one or more removed undercut regions can correspond to the one or more undercut regions. Generating the digital retention mesh can include: determining a digital source mesh and a digital target mesh from the digital undercut mesh and the digital non-undercut mesh, determining one or more corresponding pairs of points between the digital source mesh and the digital target mesh, and discarding one or more poorly corresponding pairs of points. Determining one or more corresponding pairs of points can include sampling the digital source mesh and the digital target mesh to determine the closest point on the opposite mesh. Discarding can include determining an angle between the normals of the corresponding pair of points exceeds a correspondence angle threshold. The correspondence angle threshold can be configurable. Generating the digital retention mesh can further include determining a corresponding pair constraint between the points in each corresponding pair. Generating the digital retention mesh can further include determining an edge constraint between adjacent vertices of the digital source mesh. Providing a digital retention feature can further include: displaying the digital retention mesh including one or more morphable regions, the one or more morphable regions including one or more removed regions from a digital undercut mesh, receiving a selected morph region of the digital retention mesh, and restoring at least a portion of the shape of the selected morph region to the digital retention mesh to provide a retention feature. Restoring at least a portion of the shape can include restoring a region and an amount of the shape.

Figure 9B:
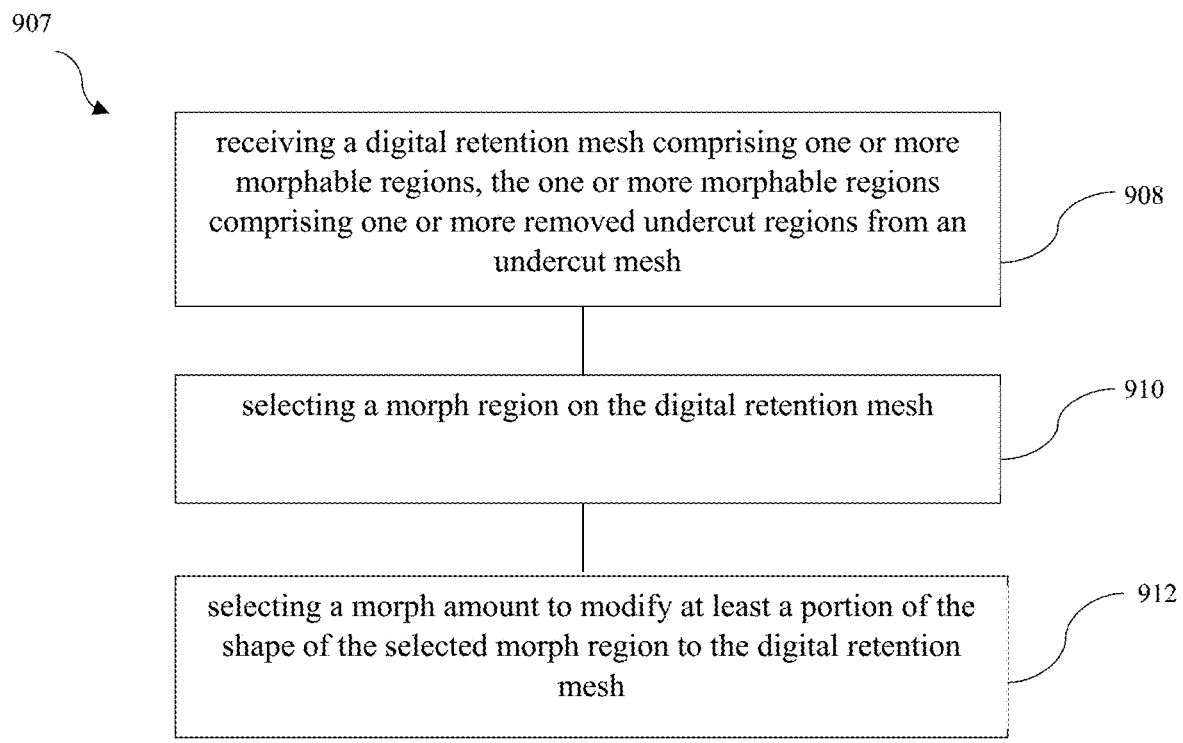

Some embodiments can include a computer-implemented method of designing a digital retention feature. For example, FIG. 9(b) illustrates a computer-implemented method of designing a digital retention feature that can include: receiving a digital retention mesh including one or more morphable regions at 908, the one or more morphable regions including one or more removed undercut regions from an undercut mesh, selecting a morph region on the digital retention mesh at 910, and selecting a morph amount to modify at least a portion of the shape of the selected morph region to the digital retention mesh to provide a retention feature at 912.

The method can optionally include that a morph region maximum can include a removed undercut region shape.

Figure 10:
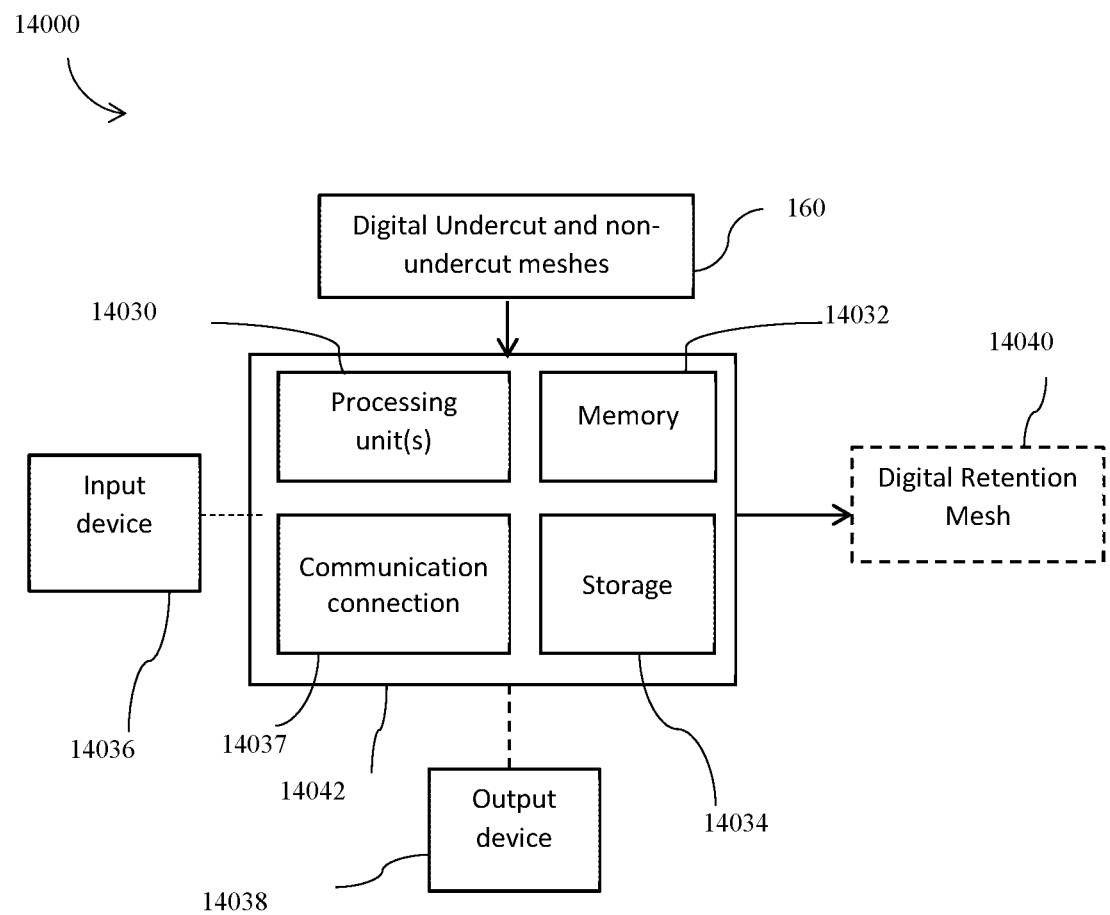
FIG. 10 is a plan view of a system in some embodiments.

FIG. 10 illustrates a processing system 14000 in some embodiments. The system 14000 can include a processor 14030, computer-readable storage medium 14034 having instructions executable by the processor to perform steps described in the present disclosure. The system 14000 can provide a digital retention mesh 14040.

Some embodiments include a processing system, including: a processor, a computer-readable storage medium including instructions executable by the processor to perform steps including: receiving a digital undercut mesh including one or more undercut regions, receiving a digital non-undercut mesh including one or more removed undercut regions, and generating a digital retention mesh including one or more morphable regions, the one or more morphable regions corresponding to the one or more removed undercut regions.

The system can include optional features. For example, the one or more removed undercut regions can correspond to the one or more undercut regions. Generating the digital retention mesh can include: determining a digital source mesh and a digital target mesh from the digital undercut mesh and the digital non-undercut mesh, determining one or more corresponding pairs of points between the digital source mesh and the digital target mesh, and discarding one or more poorly corresponding pairs of points. Determining one or more corresponding pairs of points can include sampling the source digital model and the target digital model and determining the closest point on the opposite mesh. Discarding can include determining an angle between the normals of the corresponding pair of points exceeds a correspondence angle threshold. Generating the digital retention mesh can further include determining a corresponding pair constraint between the points in each corresponding pair. Generating the digital retention mesh can further include determining an edge constraint between adjacent vertices of the digital source mesh. The correspondence angle threshold can be configurable.

Some embodiments can include a non-transitory computer readable medium storing executable computer program instructions for providing a digital retention feature, the computer program instructions including instructions for receiving a digital undercut mesh comprising one or more undercut regions receiving a digital non-undercut mesh comprising one or more removed undercut regions and generating a digital retention mesh comprising one or more morphable regions, the one or more morphable regions corresponding to the one or more removed undercut regions.

One or more of the features disclosed herein can be performed and/or attained automatically, without manual or user intervention. One or more of the features disclosed herein can be performed by a computer-implemented method. The features—including but not limited to any methods and systems—disclosed may be implemented in computing systems. For example, the computing environment 14042 used to perform these functions can be any of a variety of computing devices (e.g., desktop computer, laptop computer, server computer, tablet computer, gaming system, mobile device, programmable automation controller, video card, etc.) that can be incorporated into a computing system comprising one or more computing devices. In some embodiments, the computing system may be a cloud-based computing system.

For example, a computing environment 14042 may include one or more processing units 14030 and memory 14032. The processing units execute computer-executable instructions. A processing unit 14030 can be a central processing unit (CPU), a processor in an application-specific integrated circuit (ASIC), or any other type of processor. In some embodiments, the one or more processing units 14030 can execute multiple computer-executable instructions in parallel, for example. In a multi-processing system, multiple processing units execute computer-executable instructions to increase processing power. For example, a representative computing environment may include a central processing unit as well as a graphics processing unit or co-processing unit. The tangible memory 14032 may be volatile memory (e.g., registers, cache, RAM), non-volatile memory (e.g., ROM, EEPROM, flash memory, etc.), or some combination of the two, accessible by the processing unit(s). The memory stores software implementing one or more innovations described herein, in the form of computer-executable instructions suitable for execution by the processing unit(s).

A computing system may have additional features. For example, in some embodiments, the computing environment includes storage 14034, one or more input devices 14036, one or more output devices 14038, and one or more communication connections 14037. An interconnection mechanism such as a bus, controller, or network, interconnects the components of the computing environment. Typically, operating system software provides an operating environment for other software executing in the computing environment, and coordinates activities of the components of the computing environment.

The tangible storage 14034 may be removable or non-removable, and includes magnetic or optical media such as magnetic disks, magnetic tapes or cassettes, CD-ROMs, DVDs, or any other medium that can be used to store information in a non-transitory way and can be accessed within the computing environment. The storage 14034 stores instructions for the software implementing one or more innovations described herein.

The input device(s) may be, for example: a touch input device, such as a keyboard, mouse, pen, or trackball; a voice input device; a scanning device; any of various sensors; another device that provides input to the computing environment; or combinations thereof. For video encoding, the input device(s) may be a camera, video card, TV tuner card, or similar device that accepts video input in analog or digital form, or a CD-ROM or CD-RW that reads video samples into the computing environment. The output device(s) may be a display, printer, speaker, CD-writer, or another device that provides output from the computing environment.

The communication connection(s) enable communication over a communication medium to another computing entity. The communication medium conveys information, such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media 14034 (e.g., one or more optical media discs, volatile memory components (such as DRAM or SRAM), or nonvolatile memory components (such as flash memory or hard drives)) and executed on a computer (e.g., any commercially available computer, including smart phones, other mobile devices that include computing hardware, or programmable automation controllers) (e.g., the computer-executable instructions cause one or more processors of a computer system to perform the method). Any of the computer-executable instructions for implementing the disclosed techniques as well as any data created and used during implementation of the disclosed embodiments can be stored on one or more computer-readable storage media 14034. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, Python, JavaScript, Adobe Flash, or any other suitable programming language.

For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

In view of the many possible embodiments to which the principles of the disclosure may be applied, it should be recognized that the illustrated embodiments are only examples and should not be taken as limiting the scope of the disclosure.

What is claimed is:

1. A computer-implemented method of providing a digital retention feature, comprising:

receiving a digital undercut mesh comprising one or more undercut regions;

converting a digital undercut model of the digital undercut mesh to a voxel representation;

removing one or more undercut regions from the voxel representation to provide a non-undercut voxel representation;

converting the non-undercut voxel representation to a triangle mesh to provide a digital non-undercut mesh comprising one or more removed undercut regions;

generating a digital retention mesh comprising one or more morphable regions, the one or more morphable regions corresponding to the one or more removed undercut regions;

determining a digital source mesh and a digital target mesh from the digital undercut mesh and the digital non-undercut mesh;

receiving one or more vertices of the digital retention mesh falling within a user-selected morph region; and modifying a shape of the digital retention mesh by interpolating the one or more vertices of the digital retention mesh toward or away from their corresponding source mesh vertices, wherein the digital retention mesh provides a map between the one or more undercut regions and the one or more removed undercut regions, wherein generating the digital retention mesh comprises:
   determining one or more corresponding pairs of points between the digital source mesh and the digital target mesh; and
   discarding one or more poorly corresponding pairs of points,
wherein a number of the one or more corresponding pair of points is based on a tunable sampling density value,
wherein a poorly corresponding pair of points comprises a pair of points whose correspondence crosses a correspondence of another corresponding pair of points,
wherein the digital retention mesh comprises a computer aided design ("CAD") model.

2. The method of claim 1, wherein the one or more removed undercut regions correspond to the one or more undercut regions.

3. The method of claim 1, wherein determining the one or more corresponding pairs of points comprises sampling the digital source mesh and the digital target mesh to determine the closest point on the opposite mesh.

4. The method of claim 1, wherein discarding comprises determining an angle between the normals of the one or more corresponding pair of points exceeds a correspondence angle threshold.

5. The method of claim 4, wherein the correspondence angle threshold is configurable.

6. The method of claim 1, further comprising determining a corresponding pair constraint between the points in each corresponding pair.

7. The method of claim 1, further comprising determining an edge constraint between adjacent vertices of the digital source mesh.

8. The method of claim 1, further comprising:
   displaying the digital retention mesh comprising the one or more morphable regions, the one or more morphable regions comprising one or more removed regions from the digital undercut mesh;
   receiving a selected morph region of the digital retention mesh; and
   restoring at least a portion of the shape of the selected morph region to the digital retention mesh to provide a retention feature.

9. The method of claim 8, wherein restoring at least a portion of the shape comprises restoring a region and an amount of the shape.

10. A computer-implemented method of designing a digital retention feature, comprising:
   receiving a digital undercut mesh comprising one or more undercut regions;
   converting a digital undercut model of the digital undercut mesh to a voxel representation;
   removing one or more undercut regions from the voxel representation to provide a non-undercut voxel representation;
   converting the non-undercut voxel representation to a triangle mesh to provide a digital non-undercut mesh comprising one or more removed undercut regions;
   generating a digital retention mesh comprising one or more morphable regions, the one or more morphable regions corresponding to the one or more removed undercut regions;
   selecting a morph region on the digital retention mesh;
   selecting a morph amount to modify at least a portion of the shape of the selected morph region to the digital retention mesh to provide a retention feature,
   receiving one or more vertices of the digital retention mesh falling within a user-selected morph region; and
   modifying a shape of the digital retention mesh by the one or more vertices of the digital retention mesh toward or away from their corresponding digital source mesh vertices,
wherein the digital retention mesh provides a map between one or more undercut regions and the one or more removed undercut regions,
wherein the digital retention mesh comprises one or more corresponding pairs of points between a digital source mesh and a digital target mesh,
wherein a number of the one or more corresponding pair of points is based on a tunable sampling density value,
   wherein a poorly corresponding pair of points comprises a pair of points whose correspondence crosses a correspondence of another corresponding pair of points,
   wherein the digital retention mesh comprises a computer aided design ("CAD") model.

11. The method of claim 10, wherein a morph region maximum comprises a removed undercut region shape.

12. A system for providing a digital retention feature, comprising:
   a processor;
   a computer-readable storage medium comprising instructions executable by the processor to perform steps comprising:
   receiving a digital undercut mesh comprising one or more undercut regions;
   converting a digital undercut model of the digital undercut mesh to a voxel representation;
   removing one or more undercut regions from the voxel representation to provide a non-undercut voxel representation;
   converting the non-undercut voxel representation to a triangle mesh to provide a digital non-undercut mesh comprising one or more removed undercut regions;
   generating a digital retention mesh comprising one or more morphable regions, the one or more morphable regions corresponding to the one or more removed undercut regions;
   determining a digital source mesh and a digital target mesh from the digital undercut mesh and the digital non-undercut mesh;
   receiving one or more vertices of the digital retention mesh falling within a user-selected morph region; and
   modifying a shape of the digital retention mesh by interpolating the one or more vertices of the digital retention mesh toward or away from their corresponding source mesh vertices,
wherein the digital retention mesh provides a map between the one or more undercut regions and the one or more removed undercut regions,
wherein generating the digital retention mesh comprises:
   determining one or more corresponding pairs of points between the digital source mesh and the digital target mesh; and
   discarding one or more poorly corresponding pairs of points,
wherein a number of the one or more corresponding pair of points is based on a tunable sampling density value,
wherein a poorly corresponding pair of points comprises a pair of points whose correspondence crosses a correspondence of another corresponding pair of points, wherein the digital retention mesh comprises a computer aided design ("CAD") model.

13. The system of claim 12, wherein the one or more removed undercut regions correspond to the one or more undercut regions.

14. The system of claim 12, wherein determining the one or more corresponding pairs of points comprises sampling the source digital model and the target digital model and determining the closest point on the opposite mesh.

15. The system of claim 12, wherein discarding comprises determining an angle between the normals of the one or more corresponding pair of points exceeds a correspondence angle threshold.

16. The system of claim 12, further comprising determining a corresponding pair constraint between the points in each corresponding pair.

17. The system of claim 12, further comprising determining an edge constraint between adjacent vertices of the digital source mesh.

18. The system of claim 15, wherein the correspondence angle threshold is configurable.

\* \* \* \* \*